No. 707,923. Patented Aug. 26, 1902.
C. O. HEDSTROM.
CHAIN ADJUSTING DEVICE FOR MOTOR VEHICLES.
(Application filed Oct. 28, 1901.)
(No Model.) 2 Sheets—Sheet 1.
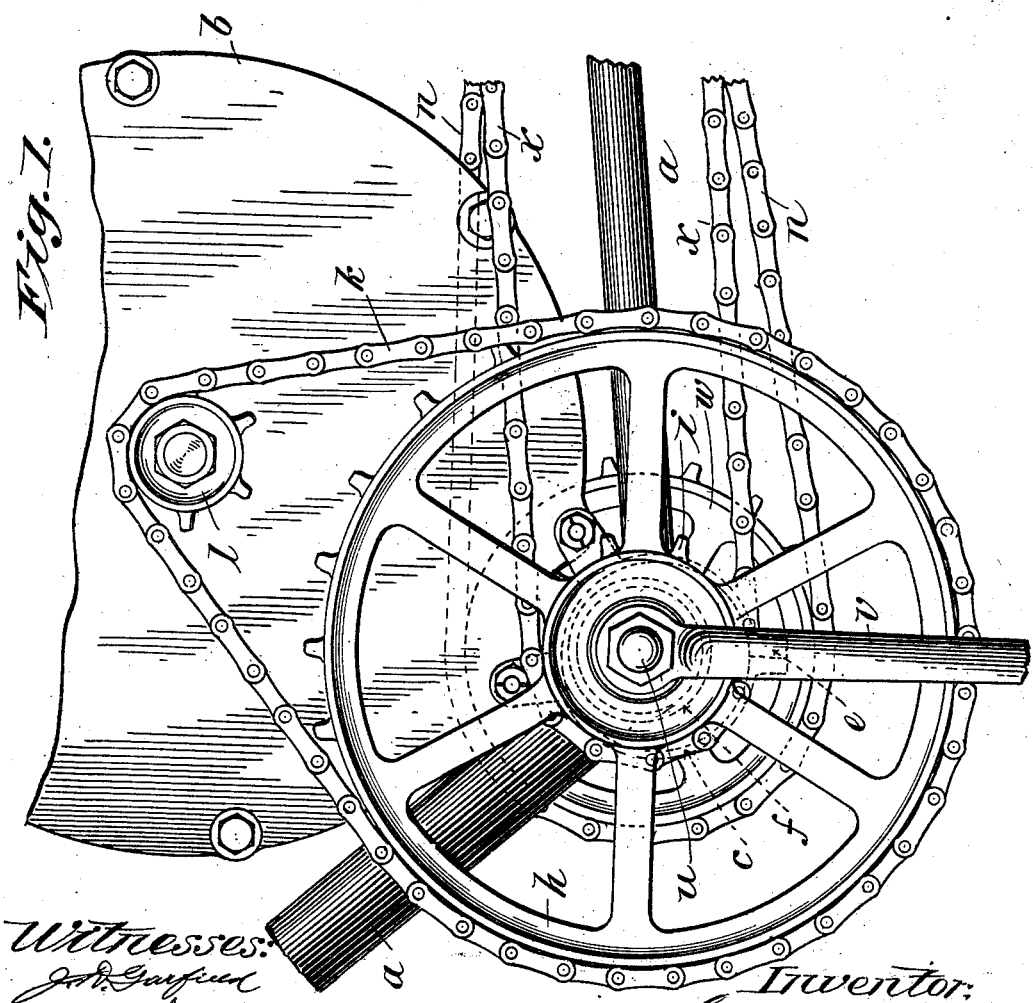

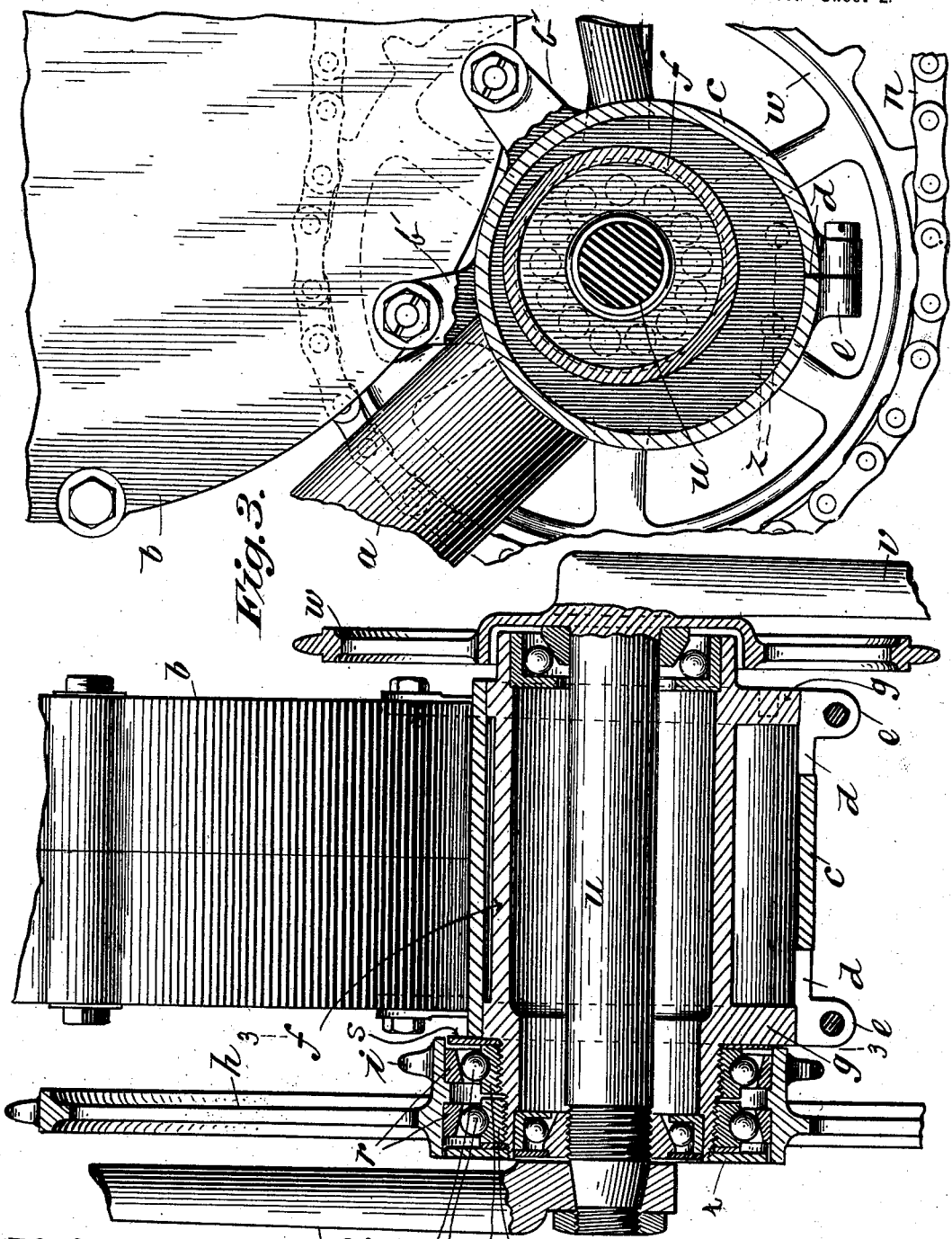

UNITED STATES PATENT OFFICE.

CARL O. HEDSTROM, OF PORTLAND, CONNECTICUT, ASSIGNOR TO GEORGE M. HENDEE, OF SPRINGFIELD, MASSACHUSETTS.

CHAIN-ADJUSTING DEVICE FOR MOTOR-VEHICLES.

SPECIFICATION forming part of Letters Patent No. 707,923, dated August 26, 1902.

Application filed October 28, 1901. Serial No. 80,195. (No model.)

*To all whom it may concern:*

Be it known that I, CARL OSCAR HEDSTROM, a citizen of the United States of America, residing at Portland, in the county of Middlesex and State of Connecticut, have invented new and useful Improvements in Chain-Adjusting Devices for Vehicles, of which the following is a specification.

This invention relates to chain-take-up devices, and has special reference to a device of this character adapted for use in motorcycles, though it is equally applicable to other chain-driven vehicles, the object of this invention being to provide means on the crank-hanger for adjusting the tension of a driving-chain between it and a driving or driven member on the vehicle; and, broadly, the invention consists in supporting a sprocket on a hub which is eccentrically located relative to the crank-hanger and rotatable in the latter for effecting the chain adjustment.

In the drawings forming part of this specification, Figure 1 is a side elevation of a part of the frame of a motor-cycle having my invention applied thereto. Fig. 2 is an enlarged longitudinal section of a crank-hanger and the chain-adjusting devices; and Fig. 3 is a transverse sectional view of the crank-hanger on line 3 3, Fig. 2.

Referring now to the drawings, $a$ indicates a part of the frame of the machine; $b$, the casing of a motor; $c$, the crank-hanger. These parts are all constructed as usual, the casing $b$ being bolted to lugs $b'$ on the crank-hanger. Opposite edges of the under side of the crank-hanger are split by oppositely-located saw-cuts $d$, which extend a short distance into the shell of the hanger toward each other, and on opposite edges of these saw-cuts are ears or lugs $e$, integral with the hanger for the reception of a screw. Within the crank-hanger there is located a hub or sleeve $f$, which is cylindrical in cross-section and is provided near each end thereof with two eccentric flanges $g$, fitting closely within the crank-hanger. This hub $f$ carries on one end thereof the sprockets $h$ and $i$, which are preferably integral and are mounted on two rows of balls $j$ and are rotatable on said hub. The sprocket $h$ is connected by a chain $k$ with another sprocket $l$ on the crank-shaft $m$ of the motor, (see Fig. 1,) and the sprocket $i$ by a chain $n$ engages a sprocket $o$ on the rear wheel and drives the vehicle.

It is obviously immaterial how the sprockets $h$ and $i$ are supported on the end of the hub $f$ which projects outside of the crank-hanger. A good and practical means, however, is shown in the drawings, (see Fig. 2,) which consists in screwing on separate rings $p$ and $q$, having an annular groove turned therein for the reception of the balls $j$ and in locating two oppositely-faced beveled rings $r$ in the hub of the sprocket-wheels $h$ and $i$ to constitute the opposite bearing-point for said balls. These ball-bearings are protected in the usual manner from dust on one side by a ring $s$, encircling the hub $f$ and on the other side by an annular nut or screw-threaded plate $t$, which closes the open end of the sprocket-wheel hub and screws up against the ring $q$ on the end of the latter.

Within each end of the hub $f$ there is a ball-bearing, constructed in the usual manner, for supporting each end of an axle $u$ concentrically with said hub. This axle is provided with cranks $v$, and on that end thereof opposite to the sprockets $h$ and $i$ there is secured in any suitable way another sprocket $w$, from which there runs a chain $x$ back to a sprocket $y$, having a driving connection with the rear axle, but constructed, preferably, in such manner as to allow the rear wheel to run free in one direction, whereby the pedals may be held stationary when the vehicle is driven by its motor, but whereby by the use of the pedals the vehicle may be propelled either when the motor is not in use or when it is desired to get the vehicle under way to produce the necessary initial compression of some explosive mixture in the motor, which, as is well understood, is ordinarily the motive force employed in power-driven vehicles of this class.

As is well known all driving-chains will become elongated more or less in use, rendering it necessary to take up the slack thereof to keep them under proper tension, whereby the best results may be obtained therefrom, and in motor-cycles where it is desirous to run a motor at high speed and gear down therefrom to the driving-wheel the crank-hanger practically becomes a counter-shaft to which the motor is directly connected, as by the chain $k$, and from which the rear wheel receives movement by means of the chain $n$, running over the sprocket $o$ from the sprocket $i$ on the hub. This counter-shaft being eccentrically located in the crank-hanger and the crank-shaft $u$ being concentrically supported in the hub, the adjustment of the chain $k$ may be effected by loosening the screws which pass through the lugs $e$ on the crank-hanger $c$, whereby the grip of the latter on the hub $f$ is slackened, and the latter may then be turned in the crank-hanger in such manner as to either tighten or slacken the chain $k$ and the screws in the lugs $e$ again tightened to hold the hub in a fixed position relative thereto. The hub $f$ may be rotated in the crank-hanger in any desirable way—as, for example, by means of a spanner, the pins of which may engage in holes $z$ in one of the flanges $g$ of the hub. Of course, in effecting the adjustment of the chain $k$, it is possible that the chains $n$ and $x$ running to the rear-wheel axis might be made either too tight or too slack; but means are provided in all machines of this character whereby, by the adjustment of the rear-wheel axle, these chains may be themselves adjusted.

Of course this chain-adjusting device is equally applicable to a bicycle or other similarly-propelled vehicle without a motor and can be applied to the chain running to the rear wheel, the axis of the latter being stationary. Its more important use, however, is that described herein, as this construction would be unnecessarily expensive for a bicycle.

Having thus described my invention, what I claim, and desire to secure by Letters Patent of the United States, is—

1. In combination with the crank-hanger of a motor-cycle, a hub eccentrically supported thereon one end of which projects beyond the end of said hanger, and means for rotatably adjusting said hub; and one or more sprocket-wheels loosely mounted on said projecting end of the hub.

2. In combination with the crank-hanger of a motor-cycle, of a hub eccentrically supported therein, one end of which projects beyond the end of said hanger, and means for rotatably adjusting said hub; a driving and a driven sprocket-wheel secured on the same hub mounted on said projecting end of said eccentric hub and freely rotatable thereon, to which chains run both horizontally and vertically, whereby the rotatable adjustment of said eccentric hub may effect the adjustment of one of said chains without affecting the adjustment of the other.

CARL O. HEDSTROM.

Witnesses:
K. I. CLEMONS,
WM. H. CHAPIN.